United States Patent
Oroskar

(10) Patent No.: US 8,977,302 B1
(45) Date of Patent: Mar. 10, 2015

(54) PROVIDING A VOICE MESSAGE PAGE IN A WIRELESS COMMUNICATION SYSTEM

(71) Applicant: Sprint Spectrum LP, Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 157 days.

(21) Appl. No.: 13/849,328

(22) Filed: Mar. 22, 2013

(51) Int. Cl.
*H04W 68/00* (2009.01)
*H04W 4/16* (2009.01)

(52) U.S. Cl.
CPC ...................................... *H04W 4/16* (2013.01)
USPC .......................................... 455/458; 455/413

(58) Field of Classification Search
USPC .......................................... 455/413, 458–461
See application file for complete search history.

(56) References Cited

U.S. PATENT DOCUMENTS

| | | | |
|---|---|---|---|
| 7,940,781 B2 * | 5/2011 | Poustchi et al. | 370/401 |
| 8,199,889 B2 | 6/2012 | Raphael et al. | |
| 2002/0160754 A1 * | 10/2002 | Alger et al. | 455/413 |
| 2008/0032714 A1 * | 2/2008 | Suzuki et al. | 455/458 |
| 2008/0188204 A1 * | 8/2008 | Gavner | 455/413 |
| 2008/0207177 A1 * | 8/2008 | Shukla | 455/413 |
| 2010/0048180 A1 * | 2/2010 | Sapkota et al. | 455/413 |
| 2011/0143721 A1 * | 6/2011 | Raphael et al. | 455/413 |
| 2011/0143723 A1 | 6/2011 | Shaw et al. | |
| 2012/0238249 A1 * | 9/2012 | Raphael et al. | 455/413 |
| 2012/0302215 A1 * | 11/2012 | Speks | 455/413 |
| 2013/0337780 A1 * | 12/2013 | Sapkota et al. | 455/413 |

* cited by examiner

*Primary Examiner* — Nathan Taylor

(57) ABSTRACT

At least one call paging message is sent to a wireless device to establish a call session with the wireless device, and it is determined whether a response is received from the wireless device to any of the at least one call paging message. When the call session is not established and a voice message is received which is intended for the wireless device, a timer comprising a timer value is initiated, wherein the timer value is based on a number of the at least one call paging message sent to the wireless device and whether a response is received from the wireless device to any of the at least one call paging message. A voice message page is sent to the wireless device when the timer expires, and a channel is established with the wireless device to provide the voice message to the wireless device.

14 Claims, 6 Drawing Sheets

PROVIDING A VOICE MESSAGE PAGE IN A WIRELESS COMMUNICATION SYSTEM

TECHNICAL BACKGROUND

Communication networks can facilitate point-to-point telephony between network endpoints. However, even in an age of widely available communication capability, including wireless communication networks, a phone call may not be answered. For example, the target device may be disconnected from a communication network, either because the device is out of range of the communication network, or because the device is turned off, and thus the target device does not signal the incoming call to a user. In addition, a user may choose not to answer an incoming call. In such cases, many communication networks provide the initiator of the call an opportunity to leave a recorded voice message for the user of the target device. Typically, a recorded voice message left by a caller is received at a processing node in the communication network (one example of which is a messaging node, such as a voice mail server). Based on the received voice message, a message notification can be sent to the target device that a message has been received for the target device.

OVERVIEW

At least one call paging message is sent to a wireless device to establish a call session with the wireless device, and it is determined whether a response is received from the wireless device to the call paging message (or any of the call paging messages, if more than one is sent). When the call session is not established, a voice message is received which is intended for the wireless device. When the voice message is received, a timer comprising a timer value is initiated, wherein the timer value is based on a number of the at least one call paging message sent to the wireless device and whether a response is received from the wireless device to any of the at least one call paging message. A voice message page is sent to the wireless device when the timer expires, and a channel is established with the wireless device to provide the voice message to the wireless device.

DETAILED DESCRIPTION

Figure 1:
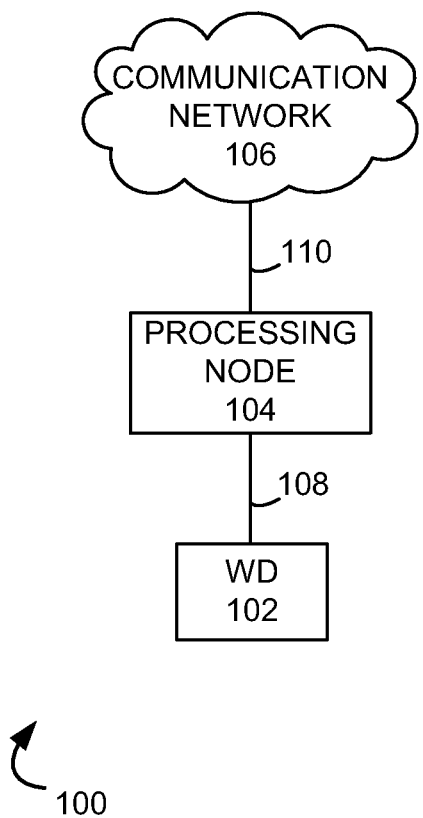
FIG. 1 illustrates an exemplary communication system to provide a voice message page in a wireless communication system.

FIG. 1 illustrates an exemplary communication system 100 to provide a voice message page comprising wireless device 102, processing node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with processing node 104 over communication link 108.

Processing node 104 is a network element capable of providing a notification message, for example, intended for wireless device 102. Processing node 104 can comprise, for example, a dedicated network node, or the functionality of location processing node 104 can be included in another network node such as a mobility management entity (MME), a call session control function (CSCF), a gateway, a proxy node, a home location register (HLR), a home subscriber server (HSS), or other network node capable of supporting the appropriate functionality. Processing node 104 can comprise a processor and associated circuitry to execute or direct the execution of computer-readable instructions. Processing node 104 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 104 can receive instructions and other input at a user interface. Processing node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise base stations, wireless communication nodes, telephony switches, internet routers, network gateways, computer systems, communication links, or some other type of communication equipment, and combinations thereof.

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between processing node 104 and communication network 106 which are omitted for clarity, including additional processing nodes, routers, gateways, and physical and/or wireless data links for carrying data among the various network elements.

In operation, at least one call paging message is sent to wireless device 102 to establish a call session with wireless device 102. The call paging message can be sent, for example, from an access node of communication system 100. It is determined whether a response is received from wireless device 102 to any of the at least one call paging message. The determination can be made, for example, at processing node 104, or at an access node of communication system 100. When the call session is not established, a voice message is received which is intended for wireless device 102. When the voice message is received, a timer comprising a timer value is initiated, wherein the timer value is based on a number of the at least one call paging message sent to the wireless device and whether a response is received from the wireless device to any of the at least one call paging message. The timer can be initiated at processing node 104, or at another network element of communication system 100, which can be at the direction of processing node 104. A voice message page is sent to wireless device 102 when the timer expires, and a channel is established with wireless device 102 to provide the voice message to wireless device 102.

Figure 2:
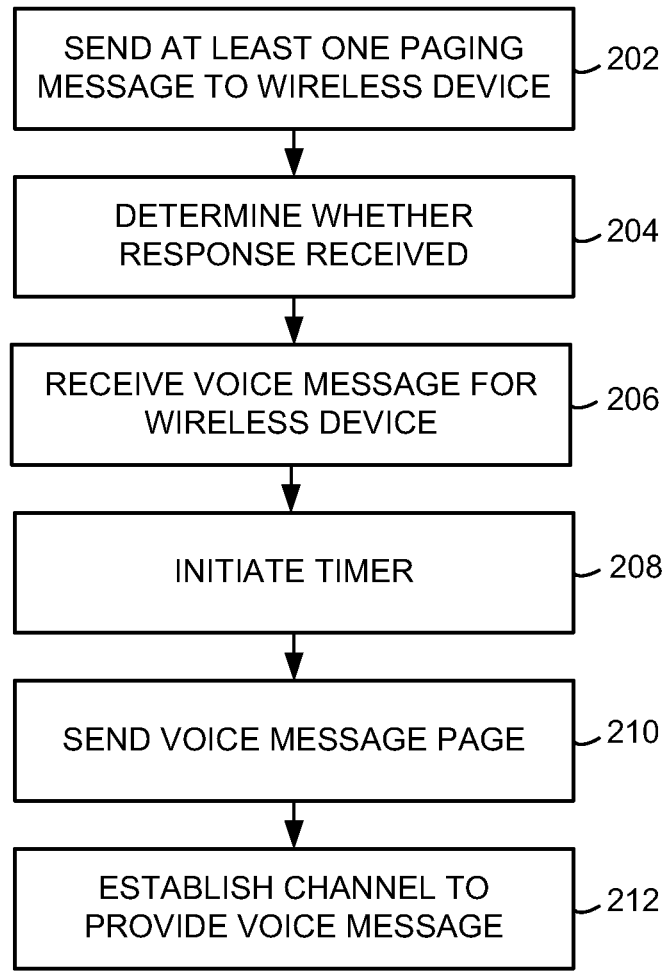
FIG. 2 illustrates an exemplary method of providing a voice message page in a wireless communication system.

FIG. 2 illustrates an exemplary method of providing a voice message page in a wireless communication system. In operation 202, at least one paging message is sent to a wireless device to establish a call session with the wireless device. Paging comprises a wireless network process to provide a notification to wireless devices. The notification can be related to incoming data or an incoming communication session request. A paging message can be sent to wireless device 102 over communication link 108. In an embodiment, the paging message can be sent using a Paging Channel (PCH), a Physical Downlink Control Channel (PDCCH), a Physical Downlink Shared Channel (PDSCH), or some other portion of communication link 108. The sending of the paging message can be directed by processing node 104.

In operation 204, it can be determined whether wireless device 102 responds to any of the call paging messages sent to wireless device 102 to establish a call session with wireless device 102. For example, wireless device 102 may be disconnected from a communication system 100, either because the wireless device 102 is has moved out of range of communication system 100, or because the wireless device 102 is turned off. In addition, a user of wireless device 102 may choose not to answer an incoming call, or a user of wireless device 102 may provide an input to wireless device 102 to refuse an incoming call.

In operation 206, a voice message intended for the wireless device is received when the call session is not established. For example, when a call session is not established with wireless device 102 based on the at least one call paging message, a voice message intended for wireless device 102 can be received. In an embodiment, the at least one call paging message is sent to indicate to wireless device 102 that another device wishes to establish a communication session with wireless device 102, such as, for example, an incoming phone call (which can be, for example, an interconnect communication session, cellular communication session, a voice over internet protocol (VoIP) communication session, and the like). When wireless device 102 does not respond to the voice paging message(s), or when wireless device provides an indication that it refuses the incoming call, the initiating caller can be provided with an invitation to record a voice message for wireless device 102. In operation 206, a voice message intended for the wireless device is received from the initiating caller when the call session is not established.

In operation 208, a timer is initiated comprising a timer value, wherein the timer value is based on a number of the at least one call paging message sent to the wireless device and whether a response is received from the wireless device to any of the at least one call paging message. For example, three call paging messages may be sent to wireless device 102, and no response may be received by processing node 104. This can occur, for example, when wireless device 102 is out of range of the communication system (for example, out of a coverage area of access node 104), or when wireless communication link conditions are insufficient for wireless device 102 to receive a call paging message, or when signals to wireless device 102 are blocked by an environmental impediment, or when wireless device 102 is powered off. As another example, one call paging message can be sent to wireless device 102, and wireless device 102 can respond to the single call paging message. For example, wireless device 102 can receive the call paging message, and can send an indication rejecting an incoming communication session, for example, in response to a user inputting a refusal to answer an incoming call to wireless device 102. As another example, two call paging messages can be sent to wireless device 102, and wireless device 102 can respond to the second call paging message. This may occur, for example, where wireless communication conditions are poor, or where wireless device 102 is highly mobile and moving through areas of varying communication conditions, for example, such that wireless device 102 did not receive the first call paging message, but did receive the second call paging message. Other examples of paging messages being sent, received and responded to are also possible. In operation 208, a timer can be initiated comprising a timer value, wherein the timer value is based on a number of the at least one call paging message sent to the wireless device and whether a response is received from the wireless device to any of the at least one call paging message.

In operation 210, a voice message page is sent to the wireless device when the timer expires. For example, when a call paging message is sent to wireless device 102, and wireless device 102 does not respond or refuses the call, typically a communication system provides an initiator of the call an opportunity to leave a message, such as a recorded voice message, for the user of wireless device 102. The recorded voice message can be received at a network element of communication system 100 (not illustrated), and the network element receiving the voice message can provide an indication of the voice message to, for example, processing node 104.

In operation 212, a channel is established to provide the voice message to the wireless device. For example, wireless device 102 can send a message to an access node requesting a communication session. The message can be initiated by an input to wireless device 102, such as an input initiating a voice message retrieval function of wireless device 102, or it can be a phone number for a voice mail service, or it can be some other input. In response to the request for a communication session, a channel can be established with wireless device 102 to provide the voice message to the wireless device. Providing the voice message to wireless device 102 can comprise downloading a file comprising the entire voice message to wireless device 102, or it can comprise streaming an audio file to wireless device 102, or it can comprise establishing a voice channel or communication session (such as an interconnect communication session, or a push-to-talk or similar half duplex communication session) to communicate the voice message to wireless device 102. Other examples are also possible, including combinations of the foregoing.

Figure 3:
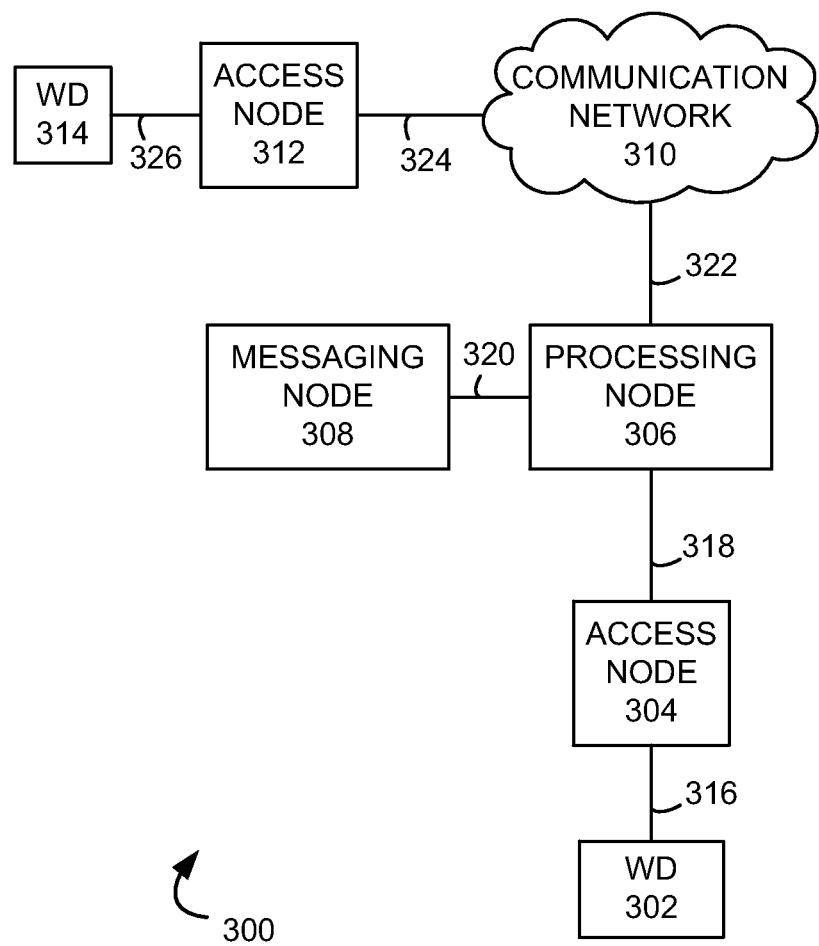
FIG. 3 illustrates another exemplary communication system to provide a voice message page in a wireless communication system.

FIG. 3 illustrates another exemplary communication system 300 to provide a message notification in a wireless communication system comprising wireless devices 302 and 314, access nodes 304 and 312, processing node 306, messaging node 308, and communication network 310. Examples of wireless devices 302 and 314 can comprise a cell phone, a smart phone, a computing platform such as a laptop, palmtop, or tablet, a personal digital assistant, or an internet access device, including combinations thereof. Wireless device 302 is in communication with access node 304 over communication link 316, and wireless device 314 is in communication with access node 312 over communication link 326.

Access nodes 304 and 314 are each a network node capable of providing wireless communications to wireless devices 302 and 314, respectively, and can be, for example, a base transceiver station, a radio base station, an eNodeB device, or an enhanced eNodeB device. Access node 304 is in communication with processing node 306 over communication link 318, and access node 312 is in communication with communication network 310 over communication link 324.

Processing node 306 is a network element capable of providing a notification message, for example, intended for wireless device 302. Processing node 306 can comprise, for example, a dedicated network node, or the functionality of processing node 306 can be included in another network node such as a mobility management entity (MME), a call session control function (CSCF), a gateway, a proxy node, a home location register (HLR), a home subscriber server (HSS), or other network node capable of supporting the appropriate functionality. Processing node 306 can comprise a processor and associated circuitry to execute or direct the execution of computer-readable instructions. Processing node 306 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Processing node 306 can receive instructions and other input at a user interface. Processing node 306 is in communication with communication network 310 over communication link 322, and with messaging node 308 over communication link 320.

Messaging node 308 is a network element capable of receiving a message for a wireless device. Examples of a message for a wireless device can include a recorded voice message, an email, a text message, a recording attached to a message, or some other message, for example, intended for a wireless device such as wireless devices 302. Messaging node 308 can comprise a processor and associated circuitry, and can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Messaging node 308 can receive instructions and other input at a user interface. The functionality of messaging node 308 can be included in another network element, such as processing node 306 or some other network node. The functionality of messaging node 308 can also be distributed across two or more network elements.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also base stations, wireless communication nodes, telephony switches, internet routers, network gateways, computer systems, communication links, or some other type of communication equipment, and combinations thereof.

Communication links 316, 318, 320, 322, 324 and 326 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304 and 314, processing node 306, messaging node 308, and communication network 310 which are omitted for clarity, including additional processing nodes, routers, gateways, and physical and/or wireless data links for carrying data among the various network elements.

In operation, activity from wireless device 314 can cause a call request to be received for wireless device 302. For example, wireless device 314 may attempt to initiate a communication session with wireless device 302, but wireless device 302 either does not respond or refuses the communication session, following which wireless device 314 may record a voice message or originate another message for wireless device 302. Similarly, wireless device 314 may send an email, a text message, a recording attached to a message, or some other message for wireless device 302.

Figure 4:
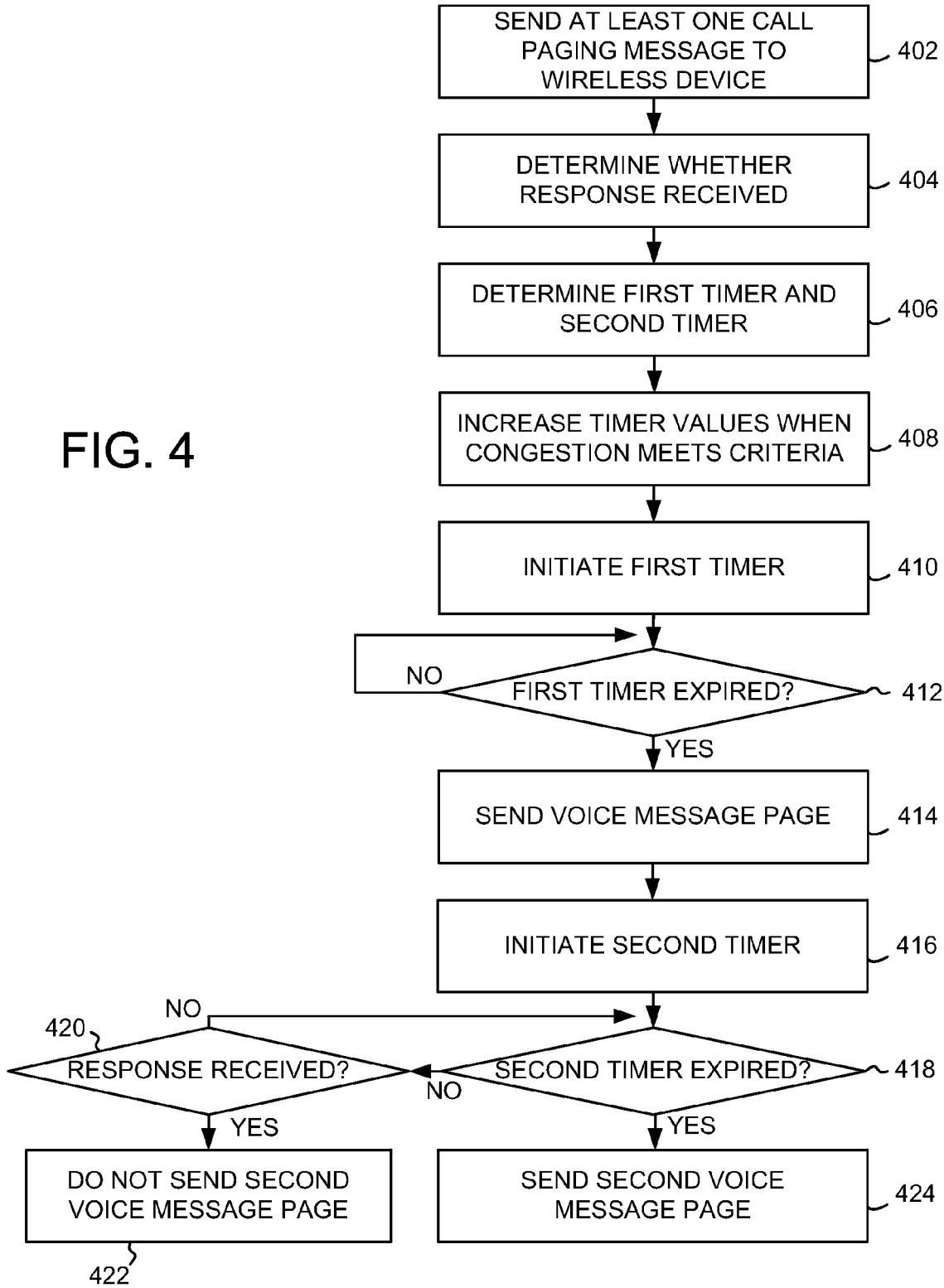
FIG. 4 illustrates another exemplary method of providing a voice message page in a wireless communication system.

FIG. 4 illustrates another exemplary method of providing a voice message page in a wireless communication system. In operation 402, at least one call paging message is sent to a wireless device, and in operation 404 it is determined whether a response is received from the wireless device to any of the paging messages. The call paging message can be related to an incoming data connection or an incoming communication session request. A call paging message can be sent to wireless device 302 over communication link 316 via access node 304. In an embodiment, the paging message can be sent using a Paging Channel (PCH), a Physical Downlink Control Channel (PDCCH), a Physical Downlink Shared Channel (PDSCH), or some other portion of communication link 316. The sending of the paging message can be directed by processing node 306, by messaging node 308, or by another network element of communication system 300. Any response from wireless device 302 can be received by processing node 306, or by messaging node 308, or another network element of communication system 300, via access node 304.

In an embodiment, at least one call paging message can be sent to wireless device 302 to notify wireless device 302 about an incoming communication session, and it can be determined whether wireless device 302 responds to any of the paging messages. For example, wireless device 302 may be disconnected from a communication system 300, either because the wireless device 302 is has moved out of range of communication system 300, communication link conditions are poor, or because the wireless device 302 is turned off. In addition, a user of wireless device 302 may choose not to answer an incoming call, or a user of wireless device 302 may provide an input to wireless device 302 to refuse an incoming call. In an embodiment, a response can be received from wireless device 302 further comprising a signal strength indicator of a signal strength of communication link 316.

In operation 406, a first timer and a second timer are determined. The first timer and the second timer can each comprise a timer value based on a number of call paging messages sent to the wireless device, and whether a response is received from the wireless device to any of the at least one paging message. For example, three call paging messages may be sent to wireless device 302, and no response may be received by processing node 306. This can occur, for example, when wireless device 302 is out of range of the communication system, or when wireless communication link conditions are insufficient for wireless device 302 to receive a call paging message, or signals to wireless device 302 are blocked by an environmental impediment, or when wireless device 302 is powered off. In such case, the first timer can be given a first setting, for example ten minutes, and the second timer can be given a second setting, for example twenty minutes. (The timer settings described herein are exemplary and are not intended as limitations.)

As another example, one call paging message can be sent to wireless device 302, and wireless device 302 can respond to the single paging message. For example, wireless device 302 can receive the call paging message, and can send an indication rejecting an incoming communication session, for example, in response to a user inputting to wireless device 302 a refusal to answer an incoming call. In such case, the first timer can be given a first setting, for example zero minutes, and the second timer can be given a second setting, for example ten seconds.

As another example, two call paging messages can be sent to wireless device 302, and wireless device 302 can respond to the second paging message. This may occur, for example, where wireless communication conditions are poor, or where wireless device 302 is highly mobile and moving through areas of varying wireless communication link quality, for example, such that wireless device 302 did not receive the first paging message, but did receive the second paging message. In such case, the first timer can be given a first setting, for example five minutes, and the second timer can be given a second setting, for example five minutes seconds. Other examples of paging messages being sent, received and responded to, and other examples of timer settings, are also possible.

In an embodiment, a paging area can also be determined based on the number of the at least one call paging message sent to the wireless device, and whether the wireless device responded to any of the at least one call paging message. For example, when one call paging message is sent to wireless device 302, and wireless device 302 responds to the single paging message, the paging area can be determined to be the last access node with which wireless device 302 was in active communication prior to wireless device 302 entering idle mode (such as, for example, access node 304). As another example, when two call paging messages are sent to wireless device 302, and wireless device 302 responds to the second paging message, the paging area can be determined to be the last known access node (e.g., access node 304) and a group of access nodes adjacent to or in proximity to access node 304 (which can be, for example, a pre-determined group, such as a tracking area or similar group of access nodes). As another example, when three call paging messages are sent to wireless device 302, and no response is received by processing node 306, the paging area can be determined to be the last known access node (e.g., access node 304), a group of access nodes adjacent to or in proximity to access node 304, and another group of access nodes adjacent to or in proximity with the group of access nodes (which can be, for example, a second pre-determined group of access nodes, such as a tracking area list or similar group of access nodes). In an embodiment, the paging area can determined according to the setting of the first and/or second timer values.

In operation 408, the first and second timer values can be increased when a congestion level of an access node meets a congestion criteria. For example, when the first and second timer values (and possibly a paging area) are determined, the last known access node of wireless device 302 can be identified (for example, based on information from processing node 306 or another network element), and further, a congestion level of access node 304 can be determined. A congestion level can comprise a level of wireless communication link resource utilization, such as a number of wireless devices requesting communication resources, a number of resource elements used to provide information over communication link 316, a number of physical resource blocks used to provide information over communication link 316, a number of other physical resources utilized over communication link 316 (such as Walsh codes and so forth), the type of traffic carried over communication link 316 (such as traffic with a high routing priority, or with a high quality of service or high guaranteed bandwidth requirement), and the like, including combinations thereof. A congestion criteria can comprise a threshold level of congestion, a combination of threshold levels of several types of congestion level, and the like. Increasing the first and second timer values can permit the sending of the call paging message(s) at a later time, and to permit the conveyance of other traffic types before the sending of the call paging message(s).

In an embodiment, the first and/or second timer values can be increased by a first time when the congestion level of the access node meets a first congestion criteria, and the first and/or second timer values can be increased by a second time when the congestion level of the access node meets a second congestion criteria. For example, the first and/or second timers can be lengthened by a different amount based on the level of congestion detected at access node 304, to permit an increasing duration of the first and second timers to be set as access node congestion increases.

In operation 410, the first timer is initiated, and in operation 412 is it determined whether the first timer has expired. When it is determined that the first timer has expired (operation 412—YES), a voice message page is sent to wireless device 302 indicating that a message is available for the wireless device (operation 414). The voice message page can notify wireless device 302 that a recorded voice message is available for wireless device 302. In an embodiment, the voice message page can also indicate the availability of another message for wireless device 302, such as an email, a text message, a recording attached to a message, or some other message.

In operation 416, the second timer is initiated, and in operation 418 is it determined whether the second timer has expired. When the second timer has not expired (operation 418—NO), it can be determined whether a response is received from wireless device 302 (operation 420). When a response is received to the message notification (operation 420—YES), then a second voice message page is not sent (operation 422). For example, when wireless device 302 retrieves the available message, for example, by listening to the recorded voice message, or by requesting delivery of a waiting message, then a second notification message is not sent. In an embodiment, wireless device 302 can send a message via access node 304 to messaging node 308 to, for example, listen to a recorded voice message, or to request a pending email, a text message, a recording attached to a message, or some other message.

When it is determined that the second timer has expired (operation 418—YES), a second voice message page is sent to wireless device 302 indicating that the voice message is available for the wireless device (operation 424). Similar to the first message notification, the second voice message page can notify wireless device 302 that a recorded voice mail, an email, a text message, a recording attached to a message, or some other message is available for wireless device 302.

Figure 5:
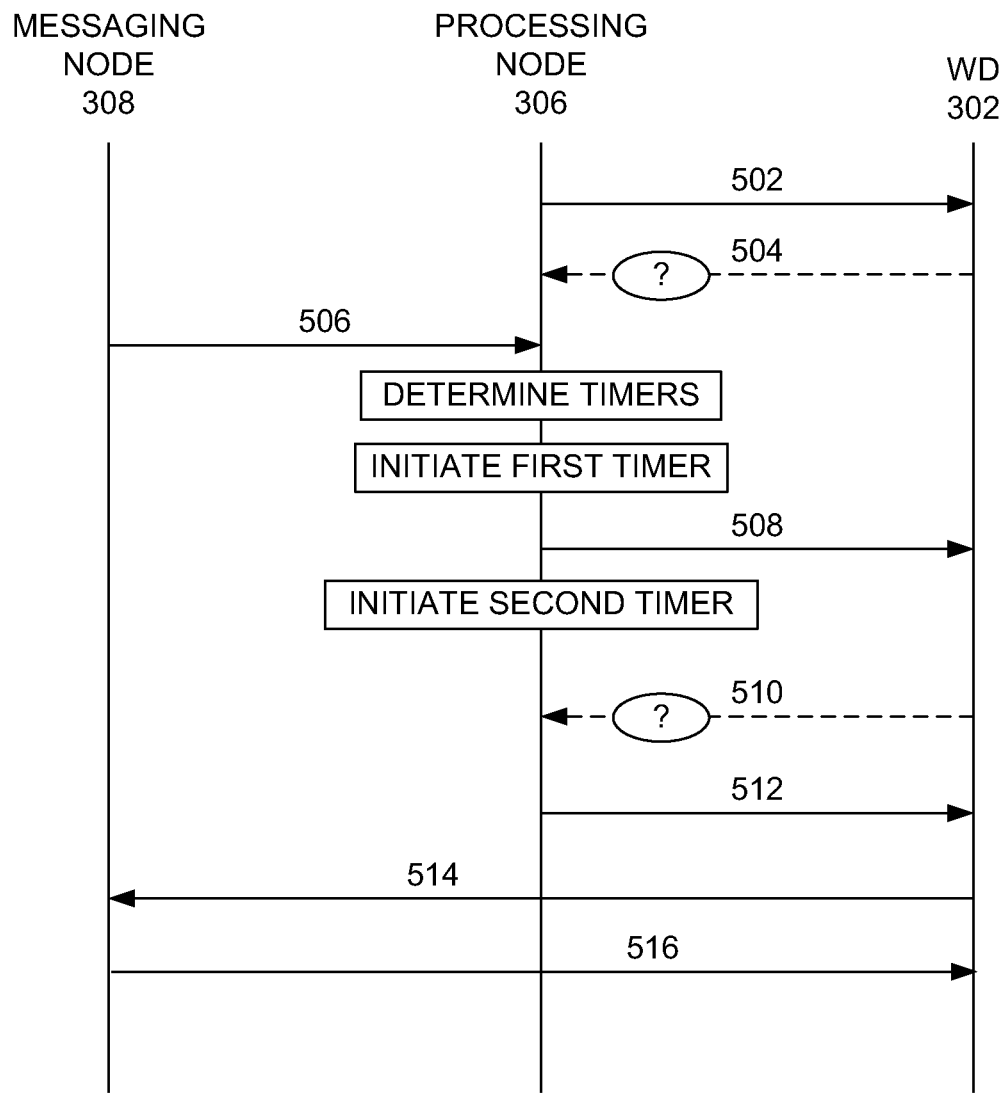
FIG. 5 illustrates a message flow diagram of an exemplary method of providing a voice message page in a wireless communication system.

FIG. 5 illustrates a message flow diagram of an exemplary method of providing a message notification in a wireless communication system. Processing node 306 directs the sending of one or more call paging messages 502 to wireless device 302. Processing node 306 determines whether a response 504 is received from wireless device 302 to any of the one or more paging messages 502.

Processing node 306 receives a message notifier 506 indicating that a message is available for wireless device 302. Processing node 306 can determine a first timer and a second timer, each timer comprising a timer value based on a number of the at least one paging message sent to the wireless device, and whether a response is received from the wireless device to any of the at least one paging message. In an embodiment, the first and/or second timer values can also be based on a congestion level determined at access node 304 from wireless device 302.

Processing node 306 initiates (or instructs the initiation of) the first timer, and when it is determined that the first timer has expired, a voice message page 508 is sent to wireless device 302 indicating that a message is available for wireless device 302. The voice message page can notify wireless device 302 that a recorded voice mail, an email, a text message, a recording attached to a text message, or some other message is available. When voice message page 508 is sent to wireless device 302, the second timer is initiated.

During the running of the second timer, it can be determined whether wireless device 302 responds 510 to message notification 508. Wireless device 302 can respond to message notification 508, for example, by listening to the recorded voice message, or requesting the delivery of the recorded voice message, or of an email, a text message, a recording attached to a message, or some other message. When wireless device 302 responds 510 to message notification 508 before the expiration of the second timer, a second a voice message page 512 is not sent.

When it is determined that the second timer expires before a response is received from wireless device 302, a second a voice message page 512 is sent to wireless device 302. Similar to voice message page 508, second voice message page 512 can notify wireless device 302 that a message is available for wireless device 302.

In an embodiment, when wireless device 302 receives second voice message page 512, wireless device can send a request 514 to receive the available message. For example, request 514 can be sent to messaging node 308 via processing node 306. As another example, request 514 can be sent to processing node 306, and processing node 306 can send a second request to messaging node 308 based on request 514 from wireless device 302. When messaging node 308 receives request 514, messaging node 308 can provide the available message to wireless device 302, for example, in or together with message 516. It is noted that response 510, described above, can be a request to receive the available message, in which case processing node 306 can pass on the request to messaging node 308, or generate a request to messaging node 308 based on response 510 from wireless device 302. In such case, the messages sent among wireless device 302, processing node 306, and messaging node 308 are similar to the messages 514 and 516, described above.

Figure 6:
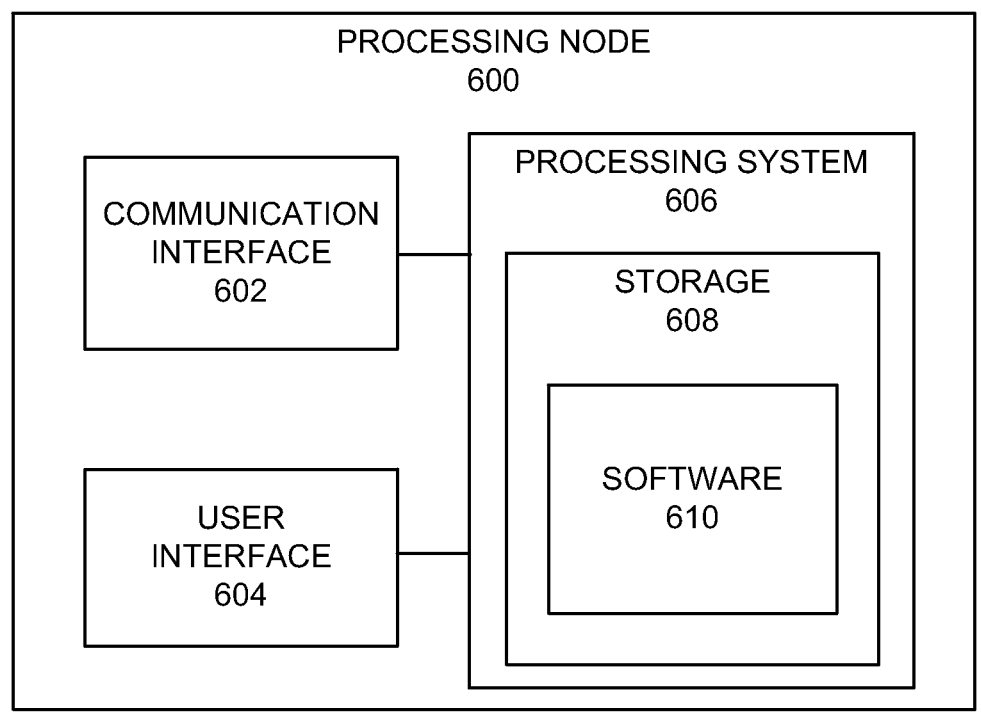
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of providing a call paging message and a voice message page to a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 608 from storage 610. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include processing node 104, processing node 306, and messaging node 308. Processing node 600 can also be a network element in communication network 106 or communication network 310, or processing node can be an adjunct or component of a network element, such as an element of communication network 106 or communication network 310.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing a voice message page in a wireless communication system, comprising:
   sending at least one call paging message to a wireless device to establish a call session with the wireless device and determining whether a response is received from the wireless device to any of the at least one call paging message;
   receiving a voice message intended for the wireless device when the call session is not established;
   initiating a timer comprising a timer value, wherein the timer value is based on a number of the at least one call paging message sent to the wireless device and whether a response is received from the wireless device to any of the at least one call paging message;
   sending a voice message page to the wireless device when the timer expires;
   and establishing a channel to provide the voice message to the wireless device;
      initiating a second timer comprising a second timer value, wherein the second timer value is based on the number of the at least one call paging message sent to the wireless device and whether the wireless device responded to any of the at least one call paging message; and
      sending a second voice message page when the second timer expires before a response is received from the wireless device to the voice message page, wherein the second timer is initiated when the timer expires.

2. The method of claim 1, further comprising sending the voice message page to a paging area, wherein the paging area is based on the number of the at least one call paging message sent to the wireless device and whether the wireless device responded to any of the at least one call paging message when the timer expires.

3. The method of claim 1, further comprising increasing the timer value when a congestion level of an access node meets a congestion criteria.

4. The method of claim 3, further comprising increasing the timer value by a first time when the congestion level of the access node meets a first congestion criteria, and increasing the timer value by a second time when the congestion level of the access node meets a second congestion criteria.

5. A method of providing a voice message page in a wireless communication system, comprising:
   sending at least one call paging message to a wireless device to establish a call session with the wireless device and determining whether a response is received from the wireless device to any of the at least one call paging message; and
   initiating a timer comprising a timer value, wherein the timer value is based on a number of the at least one call paging message sent to the wireless device and whether the wireless device responded to any of the at least one call paging message, and
   wherein the timer value further comprises
      a first setting when a first criteria indicates that the wireless device did not receive any of the at least one call paging message, and
      a second setting when a second criteria indicates that the wireless device responded to the at least one call paging message with a refusal indication; and
   sending a voice message page to the wireless device when the timer expires to establish a channel to provide the voice message to the wireless device;
   wherein the timer value further comprises a third setting when a third criteria indicates that the wireless device responded to only one of a plurality of call paging message, further comprising sending the voice message page to a paging area, wherein the paging area is determined to be a first paging area setting when the first criteria indicates that the wireless device did not receive any of the at least one call paging message, a second paging area setting when the second criteria indicates that the wireless device responded to the at least one call paging message with a refusal indication, and a third paging area setting when the third criteria indicates that the wireless device responded to only one of a plurality of call paging messages.

6. The method of claim 5, further comprising:
   initiating a second timer comprising a second timer value, wherein the second timer value is based on the number of the at least one call paging message sent to the wireless device and whether the wireless device responded to any of the call paging message, and wherein the second timer value further comprises
      a fourth setting when a fourth criteria indicates that the wireless device did not receive any of the at least one call paging message,
      a fifth setting when a fifth criteria indicates that the wireless device responded to the at least one call paging message with a refusal indication, and
      a sixth setting when a sixth criteria indicates that the wireless device responded to only one of a plurality of call paging messages.

7. The method of claim 6, further comprising sending a second voice message page when the second timer expires before a response is received from the wireless device to the voice message page.

8. The method of claim 6, further comprising increasing the timer value by a first time when the congestion level of the access node meets a first congestion criteria.

9. The method of claim 8, further comprising increasing the timer value by a second time when the congestion level of the access node meets a second congestion criteria.

10. The method of claim 5, wherein the second timer starts when the timer expires.

11. A system for providing a voice message page in a wireless communication system, comprising:
a processing node configured to
instruct the sending of at least one call paging message to a wireless device to establish a call session with the wireless device and determining whether a response is received from the wireless device to any of the at least one call paging message;
receive a voice message intended for the wireless device when the call session is not established;
initiate a timer comprising a timer value, wherein the timer value is based on a number of the at least one call paging message sent to the wireless device and whether a response is received from the wireless device to any of the at least one call paging message;
instruct the sending of a voice message page to the wireless device when the timer expires; and
instruct the establishing of a channel to provide the voice message to the wireless device;
wherein the processing node is further configured to: initiate a second timer comprising a second timer value, wherein the second timer value is based on the number of the at least one call paging message sent to the wireless device and whether the wireless device responded to any of the at least one call paging message; and instruct the sending of a second voice message page when the second timer expires before a response is received from the wireless device to the voice message page; wherein the second timer is initiated when the timer expires.

12. The system of claim 11, wherein the processing node is further configured to instruct the sending of the voice message page to a paging area, wherein the paging area is based on the number of the at least one call paging message sent to the wireless device and whether the wireless device responded to any of the at least one call paging message when the timer expires.

13. The system of claim 11, wherein the processing node is further configured to increase the timer value when a congestion level of an access node meets a congestion criteria.

14. The system of claim 11, wherein the processing node is further configured to increase the timer value by a first time when the congestion level of the access node meets a first congestion criteria, and to increase the timer value by a second time when the congestion level of the access node meets a second congestion criteria.

\* \* \* \* \*